United States Patent
de Brito Teixeira

(10) Patent No.: US 10,843,805 B2
(45) Date of Patent: Nov. 24, 2020

(54) SYSTEMS TO PREVENT INADVERTENT IN-FLIGHT DEPLOYMENT OF INFLATABLE AIRCRAFT EMERGENCY EVACUATION SLIDES

(71) Applicant: YABORÃ INDÚSTRIA AERONÁUTICA S.A., São José dos Campos (BR)

(72) Inventor: Sidney de Brito Teixeira, São José dos Campos (BR)

(73) Assignee: YABORÃ INDÚSTRIA AERONÁUTICA S.A., São José dos Campos (BR)

( * ) Notice: Subject to any disclaimer, the term of this patent is extended or adjusted under 35 U.S.C. 154(b) by 209 days.

(21) Appl. No.: 16/040,720

(22) Filed: Jul. 20, 2018

(65) Prior Publication Data

US 2019/0023407 A1 Jan. 24, 2019

Related U.S. Application Data

(60) Provisional application No. 62/535,662, filed on Jul. 21, 2017.

(51) Int. Cl.
*B64D 25/14* (2006.01)
*G05D 7/06* (2006.01)

(52) U.S. Cl.
CPC .......... *B64D 25/14* (2013.01); *G05D 7/0617* (2013.01)

(58) Field of Classification Search
CPC ..................................................... B64D 25/14
See application file for complete search history.

(56) References Cited

U.S. PATENT DOCUMENTS

| | | | | |
|---|---|---|---|---|
| 6,752,356 | B2* | 6/2004 | Baderspach | B64C 1/1407 244/129.5 |
| 7,287,727 | B2* | 10/2007 | Myers | B64D 25/14 193/25 B |
| 9,789,970 | B2* | 10/2017 | Giesa | B64D 25/14 |
| 10,293,949 | B2* | 5/2019 | John | B64D 25/14 |
| 2007/0023578 | A1* | 2/2007 | Myers | B64D 25/14 244/137.2 |
| 2011/0139934 | A1* | 6/2011 | Giesa | B64D 25/14 244/137.2 |
| 2017/0144770 | A1* | 5/2017 | Knijnenburg | B64C 1/1461 |
| 2017/0203849 | A1* | 7/2017 | John | B64D 25/14 |

* cited by examiner

*Primary Examiner* — Joseph W Sanderson
(74) *Attorney, Agent, or Firm* — Nixon & Vanderhye P.C.

(57) ABSTRACT

Inadvertent in-flight inflation of an inflatable slide associated with a non-co-located over-wing emergency door of an aircraft fuselage is prevented by a system having a source of compressed gas (e.g., a compress air cylinder) and a 3-way valve having an input port and a pair of output ports each being individually connectable to the input port. The 3-way valve is operable in response to a control signal so as to fluid-connect the source of compressed gas with either a vent line which vents the compress gas overboard or a supply line the inflatable slide. When the control signal fluid connects the gas source to the vent line, the system will be in a safe in-flight mode indicative of inflight operation of the aircraft in which case inadvertent inflation of the slide is prevented.

10 Claims, 2 Drawing Sheets

SYSTEMS TO PREVENT INADVERTENT IN-FLIGHT DEPLOYMENT OF INFLATABLE AIRCRAFT EMERGENCY EVACUATION SLIDES

CROSS-REFERENCE TO RELATED APPLICATION

This application is related to and claims domestic priority benefits from U.S. Provisional Patent Application Ser. No. 62/535,662 filed on Jul. 21, 2017, the entire contents of which are expressly incorporated hereinto by reference.

FIELD

The embodiments disclosed herein relate generally to systems and methods which prevent inadvertent in-flight deployment of inflatable aircraft emergency evacuation slides.

BACKGROUND

Certification regulations require that all commercial transport aircraft must have some means to provide safe emergency evacuation of occupants. Inflatable slide systems may be required by such regulations according to aircraft design. As is well known, evacuation slide systems installed in aircraft are designed to automatically deploy upon door opening following an emergency landing or other emergency event that requires aircraft to be immediately evacuated. A downside of such inflatable evacuation slides is that they are inherently prone to inadvertent actuation during flight.

Some of inflatable emergency slide systems, such as over-wing and off-wing evacuation slides systems are designed to deploy and inflate in an outboard direction relative to the aircraft fuselage from a fuselage stowage compartment remotely located relative to a fuselage door for occupant egress. The inadvertent in-flight deployment of such non-co-located inflatable slides may therefore result in unpredicted and unsafe consequences for the aircraft and its occupants including, for example, additional drag to aircraft in flight; impact and damage to aircraft structure; damage to or covering of certain flight control surfaces and/or departure from the aircraft and descent to the ground.

The absence of effective protection against inadvertent in-flight deployment on current inflatable slide system architectures has resulted in multiple events experienced by the current aircraft fleet in service. It is towards providing effective protection against such inadvertent in-flight deployments of inflatable slide systems that the embodiments disclosed herein are directed.

SUMMARY

In general, the embodiments disclosed herein relate to systems to prevent inadvertent in-flight inflation of an inflatable slide associated with an over-wing emergency door of an aircraft fuselage. According to certain embodiments, the systems will include a source of compressed gas (e.g., a compress air cylinder) and a 3-way valve having an input port and a pair of output ports each being individually connectable to the input port. A supply line is provided to supply compressed gas from the source thereof to the input port of the 3-way valve while a vent and supply lines are provided to fluid connect first and second ones of the output ports of the 3-way valve to an outside environment and the inflatable slide, respectively. The 3-way valve is operable in response to a control signal so as to fluid-connect the source of compressed gas with either the vent line or the supply line so as to place the system in a safe in-flight mode or an operation ground mode in dependence upon whether the aircraft is in flight or on the ground, respectively.

The 3-way valve may include an actuator to receive the control signal and operate the 3-way valve so as to fluid-connect the source of compressed gas with the vent line in response to a signal indicative of an in-flight condition of the aircraft. The actuator may therefore be adapted to receive the control signal to operate the 3-way valve so as to fluid-connect the source of compressed gas with the supply line in response to a signal indicative of an operative ground condition of the aircraft. The actuator of the 3-way valve may be actuated in response to receiving a mechanical, pneumatic and/or electrical control signal.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

Figure 1:
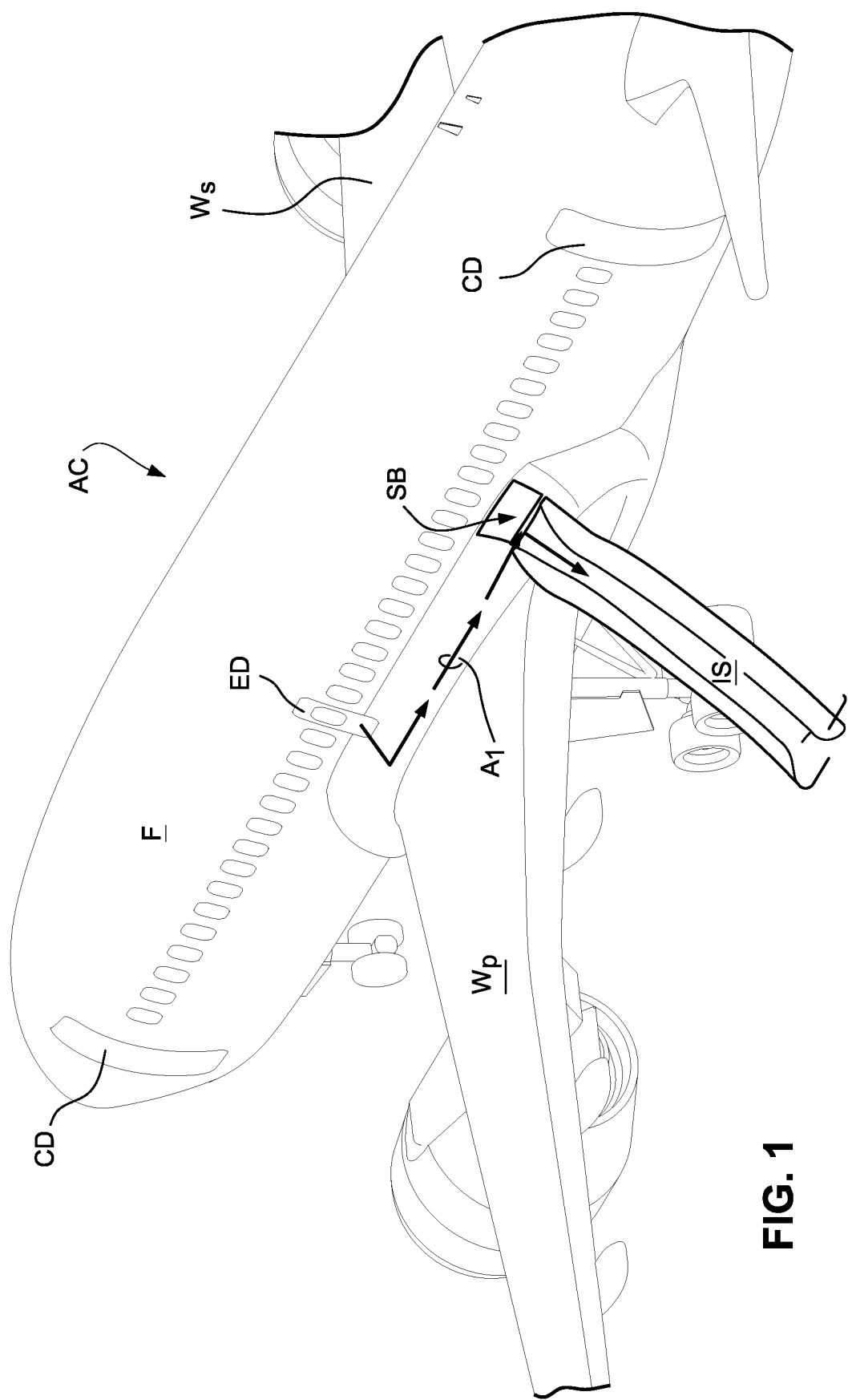
FIG. 1 is a schematic perspective view showing an aircraft with an off-wing evacuation slide inflated.

As can be seen in the schematic depiction of FIG. 1, an aircraft AC is shown having a fuselage F, port and starboard wings Wp and Ws. The fuselage F depicted includes forward and aft cabin doors CD to allow occupant ingress/egress when embarking/disembarking, respectively. The cabin doors CD are thus designed to be routinely opened and closed during aircraft ground operations. An over-wing emergency door ED is provided to allow emergency egress from the fuselage as may be commanded by the crew.

When emergency egress is required, the cabin doors CD and the over-wing emergency door CD are opened thereby causing evacuation slides to inflate. As is known, the inflatable slides (not shown) are co-located with the cabin doors CD and thus inflate directly outboard from such doors. However, the inflatable slide IS associated with the over-wing emergency door ED is caused to be inflated in an outboard direction from a stowage bin SB typically positioned near the trailing edge of the wings Wp, Ws. Thus, occupants exiting the fuselage F through the over-wing emergency door ED may progress aft along the wing surfaces to the associated inflatable slide IS as depicted by the path arrows $A_1$ in FIG. 1.

Figure 2:
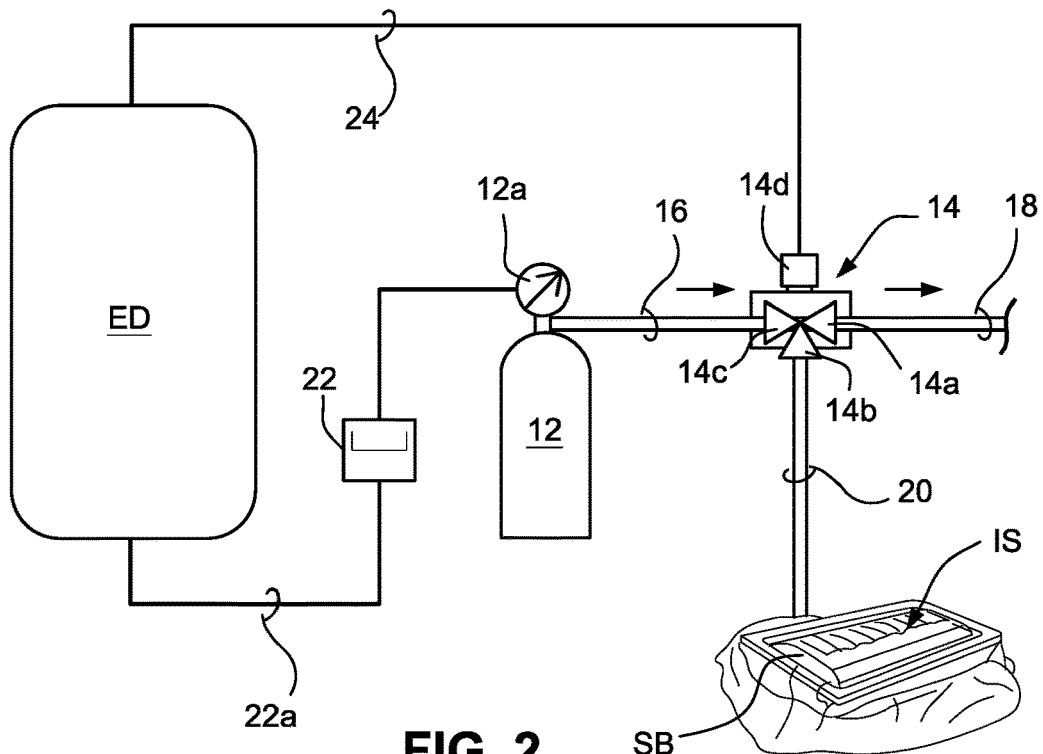
FIG. 2 is a schematic illustration showing the system in accordance with an embodiment of the invention in a "safe" in-flight mode.
Figure 3:
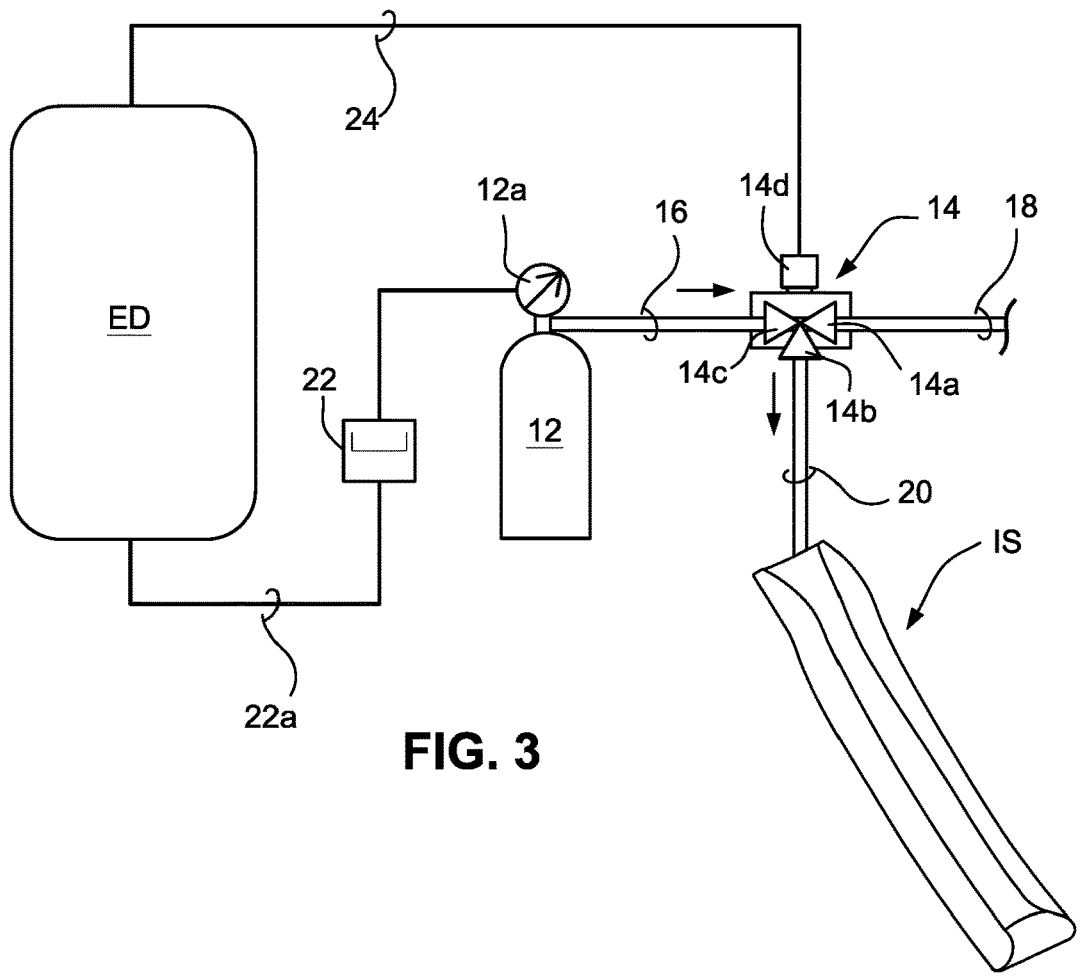
FIG. 3 is a schematic illustration showing the system in accordance with an embodiment of the invention in a "ground" operational mode.

A system 10 to prevent inadvertent in-flight inflation of the inflatable slide IS associated with the over-wing emergency door ED is depicted in accompanying FIGS. 2 and 3. As shown, the system generally includes a source of pressurized gas, e.g., a compressed air cylinder 12 provided with a pressure regulator 12a and a 3-way valve 14 having a pair of outlet ports 14a, 14b and an inlet port 14c. The compressed air cylinder 12 is connected to the inlet port 14c of the 3-way valve 14 by pressure line 16, while outlet ports 14a and 14b are connected to the vent line 18 and the actuation supply line 20.

A signal box 22 is provided to receive a control signal 22a from the door ED and interconnects with the pressure regulator 12a so as to allow the system 10 to be "armed" and thereby permit the compressed air within the cylinder 12 to be capable of discharge to allow inflation of the inflatable slide IS. Even though the system is "armed" as depicted in FIG. 2, the system 10 can be placed in a safe "in-flight" mode for in-flight operation of the aircraft AC by a mechanical or electrical control signal 24 linked to an actuator 14d of the 3-way valve 14. Although the control signal 24 is depicted in FIGS. 2 and 3 as originating from the door ED (which it may via mechanical or electrical interlocks), it is conceivable that the control signal 24 could alternatively or additionally be operatively associated with other on-board equipment, such as the cabin pressurization system, avionics (e.g., altimetry signals), weight-on-wheels transducers, and the like which evidence that the aircraft is actually on the ground and not airborne.

When the system 10 is in the safe "in-flight" mode as depicted in FIG. 2, the mechanical or electrical signal causes the actuator 14d of the 3-way valve to assume a condition such that the lines 16 and 18 are fluid connected to one another through ports 14c and 14a, respectively. In the event of an inadvertent actuation of the air cylinder 12, therefore, the compressed air will safely be vented overboard via the vent line 18 so as to prevent inflation of the inflatable slide IS. When the system 10 is in the "ground" operation mode, however, the signal 24 will cause the actuator 14d of the 3-way valve 14 to fluid-connect the lines 16 and 20 via ports 14a and 14b, respectively. As a result, any inflation of the inflatable slide IS will not present an in-flight hazard since the system 10 has assured that inflation will only occur during ground operation of the aircraft AC.

The 3-way valve can be any mechanically, pneumatically or electrically active valve and may be desired for the specific design of the system 10. Thus, depending on the nature of the input signal 24, those skilled in this art would be able to provide the specific type of 3-way valve to accomplish the functions as described above.

Various modifications within the skill of those in the art may be envisioned. Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A system to prevent inadvertent in-flight inflation of an inflatable slide associated with an over-wing emergency door of an aircraft fuselage, the system comprising:
    a source of compressed gas;
    a 3-way valve having an input port and a pair of output ports each being individually connectable to the input port;
    a supply line to supply compressed gas from the source thereof to the input port of the 3-way valve;
    a vent line which fluid-connects a first one of the output ports of the 3-way valve to a vent environment;
    a supply line which fluid-connects a second one of the output ports of the 3-way valve to the inflatable slide; wherein
    the 3-way valve being operable in response to a control signal so as to fluid-connect the source of compressed gas with either the vent line or the supply line so as to place the system in a safe in-flight mode or an operational ground mode in dependence upon whether the aircraft is in flight or on the ground, respectively.

2. The system according to claim 1, wherein the source of compressed gas is a compressed air cylinder.

3. The system according to claim 1, wherein the control signal includes an in-flight mode signal, and wherein the 3-way valve comprises an actuator which is configured to receive the in-flight mode signal to thereby operate the 3-way valve so as to fluid-connect the source of compressed gas with the vent line.

4. The system according to claim 3, wherein the control signal includes a ground operation mode signal, and wherein the actuator is configured to receive the ground operation mode signal to operate the 3-way valve so as to fluid-connect the source of compressed gas with the supply line.

5. The system according to claim 1, wherein the 3-way valve includes an actuator that is actuated in response to receiving a mechanical, pneumatic or electrical control signal.

6. An aircraft comprising a fuselage which includes an over-wing emergency door, an inflatable slide that is positioned within a stowage bin that is not co-located with the over-wing emergency door and a system to prevent inadvertent in-flight inflation of the inflatable slide, wherein the system comprises:
    a source of compressed gas;
    a 3-way valve having an input port and a pair of output ports each being individually connectable to the input port;
    a supply line to supply compressed gas from the source thereof to the input port of the 3-way valve;
    a vent line which fluid-connects a first one of the output ports of the 3-way valve to a vent environment;
    a supply line fluid which fluid-connects a second one of the output ports of the 3-way valve to the inflatable slide; wherein
    the 3-way valve is operable in response to a control signal so as to fluid-connect the source of compressed gas with either the vent line or the supply line so as to place the system in a safe in-flight mode or an operational ground mode in dependence upon whether the aircraft is in flight or on the ground, respectively.

7. The aircraft according to claim 6, wherein the source of compressed gas is a compressed air cylinder.

8. The aircraft according to claim 6, wherein the control signal includes an in-flight mode signal, and wherein the 3-way valve comprises an actuator which is configured to receive the in-flight mode signal to thereby operate the 3-way valve so as to fluid-connect the source of compressed gas with the vent line.

9. The aircraft according to claim 8, wherein the control signal includes a ground operation mode signal, and wherein the actuator is configured to receive the ground operation mode signal to operate the 3-way valve so as to fluid-connect the source of compressed gas with the supply line.

10. The aircraft according to claim 6, wherein the 3-way valve includes an actuator that is actuated in response to receiving at least one of a mechanical, pneumatic or electrical control signal.

* * * * *